(12) United States Patent
Cox et al.

(10) Patent No.: US 10,328,904 B2
(45) Date of Patent: Jun. 25, 2019

(54) WINDSCREEN WIPER DEVICE

(71) Applicant: Federal-Mogul Motorparts Corporation, Southfield, MI (US)

(72) Inventors: Dennis E. Cox, Belleville, MI (US); Jesus Yee, El Paso, TX (US); David Reyes, Chihuahua (MX)

(73) Assignee: Trico Products Corporation, Rochester Hills, MI (US)

( * ) Notice: Subject to any disclaimer, the term of this patent is extended or adjusted under 35 U.S.C. 154(b) by 0 days.

(21) Appl. No.: 15/620,852

(22) Filed: Jun. 13, 2017

(65) Prior Publication Data
US 2018/0354466 A1 Dec. 13, 2018

(51) Int. Cl.
*B60S 1/38* (2006.01)
*B60S 1/40* (2006.01)

(52) U.S. Cl.
CPC ............. *B60S 1/4016* (2013.01); *B60S 1/386* (2013.01); *B60S 1/3849* (2013.01); *B60S 1/3855* (2013.01); *B60S 1/3868* (2013.01); *B60S 1/4038* (2013.01); *B60S 2001/4022* (2013.01); *B60S 2001/4035* (2013.01); *B60S 2001/4051* (2013.01); *B60S 2001/4054* (2013.01)

(58) Field of Classification Search
CPC .... B60S 1/3867; B60S 1/3868; B60S 1/3849; B60S 1/3851; B60S 1/3855; B60S 1/3858; B60S 1/4064; B60S 1/4045; B60S 1/4048; B60S 2001/4051; B60S 2001/4054
USPC .......................................... 15/250.32, 250.43
See application file for complete search history.

(56) References Cited

U.S. PATENT DOCUMENTS

| 2,679,066 A * | 5/1954 | Nesson ................. B60S 1/3849 15/250.32 |
| 6,973,698 B1 * | 12/2005 | Kotlarski .................. B60S 1/38 15/250.43 |
| 7,337,489 B2 * | 3/2008 | Huang .................. B60S 1/3848 15/250.32 |
| 7,523,522 B2 | 4/2009 | Herring et al. |
| 8,191,200 B2 | 6/2012 | Kim |
| 8,281,453 B2 * | 10/2012 | Yang ....................... B60S 1/387 15/250.32 |
| 8,429,786 B2 | 4/2013 | Van Baelen et al. |
| 8,505,151 B2 | 8/2013 | Depondt et al. |
| 8,595,889 B2 | 12/2013 | Op't Roodt et al. |

(Continued)

FOREIGN PATENT DOCUMENTS

WO 2018071877 A1 4/2018

OTHER PUBLICATIONS

International Search Report, dated Aug. 10, 2018 (PCT/US2018/036373).

*Primary Examiner* — Gary K. Graham
(74) *Attorney, Agent, or Firm* — Miller Canfield

(57) ABSTRACT

The wiper device includes a wiper blade which extends in a longitudinal direction and at least one longitudinal strip that is pre-curved to have a curved shape when in a relaxed condition. The wiper device supports the wiper blade and biases the wiper blade into a curved shape. A connecting device is attached with the at least one longitudinal strip. The connecting device includes a two-piece base and a joint part which is pivotably connected with the two-piece base. The two-piece base includes a first piece, which is directly secured with the at least one longitudinal strip, and a second piece with laterally spaced apart side walls that are each J-shaped.

9 Claims, 6 Drawing Sheets

(56) References Cited

U.S. PATENT DOCUMENTS

| | | |
|---|---|---|
| D705,156 S | 5/2014 | Lee |
| 8,984,707 B2 * | 3/2015 | Boland ................ B60S 1/3806 15/250.201 |
| 13,973,207 | 3/2015 | Depondt |
| 9,073,519 B2 | 7/2015 | Depondt |
| 9,120,463 B2 | 9/2015 | Kim et al. |
| 9,180,839 B2 | 11/2015 | Oslizlo et al. |
| 2011/0113583 A1 | 5/2011 | Shanmugham et al. |
| 2013/0117957 A1 | 5/2013 | Ku |
| 2013/0152326 A1 | 6/2013 | Oslizlo et al. |
| 2014/0033466 A1 | 2/2014 | Obert et al. |
| 2014/0033467 A1 | 2/2014 | Obert et al. |
| 2014/0143970 A1 | 5/2014 | Baumert et al. |
| 2015/0166017 A1 | 6/2015 | Young, III et al. |
| 2018/0105142 A1 | 4/2018 | Yee et al. |

* cited by examiner

WINDSCREEN WIPER DEVICE

BACKGROUND OF THE INVENTION

1. Field of the Invention

The present invention is related, generally, to windscreen wiper devices and more particularly to the connecting devices of windscreen wiper devices.

2. Related Art

Passenger vehicles are manufactured with a range of different styles of oscillating wiper arms including, for example, various sizes of pin-style wiper arms, bayonet-style wiper arms and top lock-style wiper arms. These oscillating arms are of such different shapes and configurations that they must be secured with windscreen wiper devices in very different manners. This leads to increased design costs since a windscreen wiper device manufacturer must design and test differently configured connecting devices for attachment with the various shapes and sizes of oscillating arm and increased manufacturing costs because different components must be manufactured to attach the same type of wiper blade with the oscillating wiper arms of different vehicles.

SUMMARY OF THE INVENTION AND ADVANTAGES

One aspect of the present invention is related to a windscreen wiper device. The wiper device includes a wiper blade which extends in a longitudinal direction and at least one longitudinal strip that is pre-curved to have a curved shape when in a relaxed condition. The wiper device supports the wiper blade and biases the wiper blade into a curved shape. A connecting device is attached with the at least one longitudinal strip. The connecting device includes a two-piece base and a joint part which is pivotably connected with the two-piece base. The two-piece base includes a first piece, which is directly secured with the at least one longitudinal strip, and a second piece with laterally spaced apart side walls that are each J-shaped.

The two-piece construction of the base allows the pieces to be made of different materials from one another, thereby allowing each piece to be made of a material that is ideal for its purpose. For example, the first piece can be made of a plastic material that can be ultrasonically welded with the at least one longitudinal strip, and the second piece can be made of metal which is more resistant to deformation during operation of the wiper device.

According to another aspect of the present invention, the plastic first piece is heat staked to securely connect the first and second pieces of the base together.

According to yet another aspect of the present invention, the first piece has a pair of protrusions that are spaced from one another in the longitudinal direction, and the protrusions are received in similarly shaped openings in the second piece.

According to still another aspect of the present invention, the protrusions have different shapes. This ensures that the second piece of the base can only be installed onto the first piece in one direction or orientation, thereby improving manufacturing consistency of the wiper device.

According to a further aspect of the present invention, the heat staking is to the protrusions of the first piece of the base.

According to yet a further aspect of the present invention, the first piece of the base has a top surface with a plurality of bumps that are spaced from one another, and the second piece has a plurality of recesses that receive the bumps of the first piece. The bumps/recesses connection allows for improved transfer of forces between the first and second pieces of the base during operation of the wiper device.

According to still a further aspect of the present invention, the first piece of the base has a top surface with a groove, and the second piece has a bottom wall with a tongue that is received in the groove.

Another aspect of the present invention is related to a method of making a windscreen wiper device. The method includes the step of operably connecting at least one longitudinal strip with an elastomeric wiper strip to bias the wiper strip into a pre-curved condition. The method continues with the step of permanently attaching a first piece and a second piece together to form a base. The method proceeds with the step of operably connecting the first piece of the base with the at least one longitudinal strip. The second piece of the base has a pair of laterally spaced apart side walls that are each J-shaped. The method continues with the step of operably connecting a joint part with the second piece of the base such that the joint part is pivotable relative to the base.

According to another aspect of the present invention, the first piece is made of plastic, and the second piece is made of metal.

According to yet another aspect of the present invention, the first piece is heat staked to securely connect the first and second pieces of the base together.

According to still another aspect of the present invention, the first piece has a pair of protrusions that are spaced from one another, and the protrusions of the first piece are received in similarly shaped openings in the second piece.

According to a further aspect of the present invention, the protrusions have different shapes from one another.

The according to yet a further aspect of the present invention, the method further includes the step of heat staking the protrusions of the first piece to securely connect the first and second pieces of the base together.

According to still a further aspect of the present invention, the first piece has a top surface with a plurality of bumps, and the second piece has a plurality of recesses, and the step of permanently attaching the first and second pieces includes receiving the bumps of the first piece into the recesses of the second piece.

BRIEF DESCRIPTION OF THE DRAWINGS

These and other aspect, features and advantages of the invention will become more readily appreciated when considered in connection with the following detailed description of the presently preferred embodiment and best mode, appended claims and accompanying drawings, in which:

DETAILED DESCRIPTION OF THE ENABLING EMBODIMENT

Figure 1:
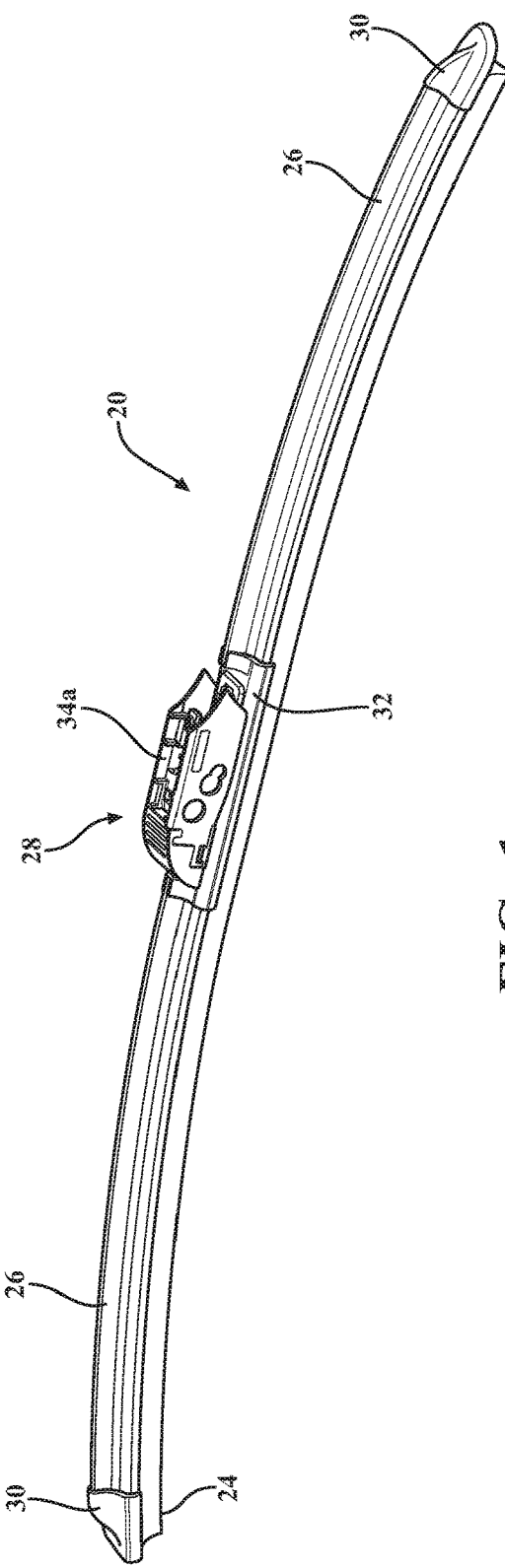
FIG. 1 is a perspective view of an exemplary embodiment of a windscreen wiper device constructed according to one aspect of the present invention.

Referring to the Figures, wherein like numerals indicate corresponding parts throughout the several views, an exemplary embodiment of a windscreen wiper device 20 is generally shown in FIG. 1. The windscreen wiper device 20 has a beam-style construction in that it includes a carrier element 22 (shown in FIG. 4) which extends lengthwise in a longitudinal direction and is pre-shaped to bias a wiper strip 24 made of an elastomeric material, such as rubber, into a curved shape. The curved shape of the wiper strip 24 allows its entire length to be sealed and remain sealed against a curved windshield (not shown) of a vehicle as the windscreen wiper device 20 oscillates back and forth across the windshield. That is, in the exemplary windscreen wiper device 20, the carrier element 22, not a series of yokes, distributes a force from an oscillating wiper arm across the length of the wiper strip 24.

Figure 4:
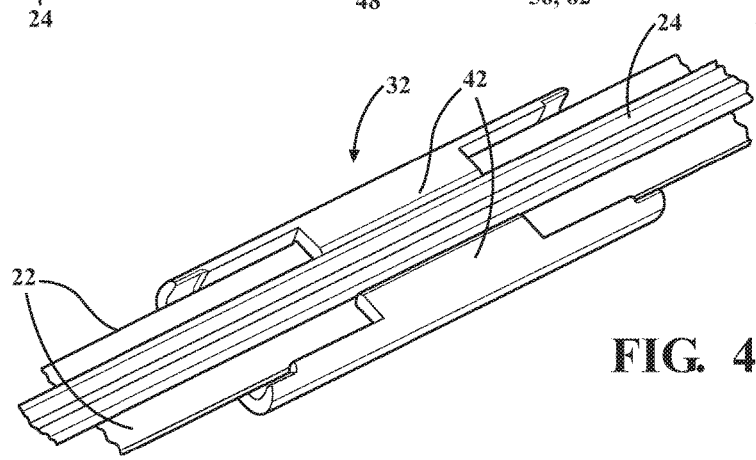
FIG. 4 is another perspective and fragmentary view of the base and taken from a different perspective than FIG. 2.

The exemplary windscreen wiper device 20 also includes a pair of sub-spoilers 26, which are made as separate pieces from one another and are attached with the carrier element 22, that are shaped to impart a downforce on the wiper strip 24 when the vehicle is travelling at speed to improve the fluid-tight seal between the wiper strip 24 and the windshield. A connecting device 28 is engaged with the carrier element 22 at approximately a longitudinal midpoint of the carrier element 22 for lockingly connecting the windscreen wiper device 20 with an oscillating wiper arm (not shown). A pair of end caps 30 are engaged with opposite ends of the carrier element 22 for retaining the sub-spoilers on the carrier element 22 between the connecting assembly 28 and the end caps 30. As shown in FIG. 4, in the exemplary embodiment, the carrier element 22 includes a pair of longitudinal strips 22 that are made of spring steel and that are received in longitudinally extending grooves of the wiper strip 24. However, it should be appreciated that the carrier element 22 could take other forms, e.g., the carrier element could be a single longitudinal strip that is glued to the wiper strip or it could be a single longitudinal strip that is received within a single longitudinal groove of a one-piece wiper strip and spoiler.

Figure 5:
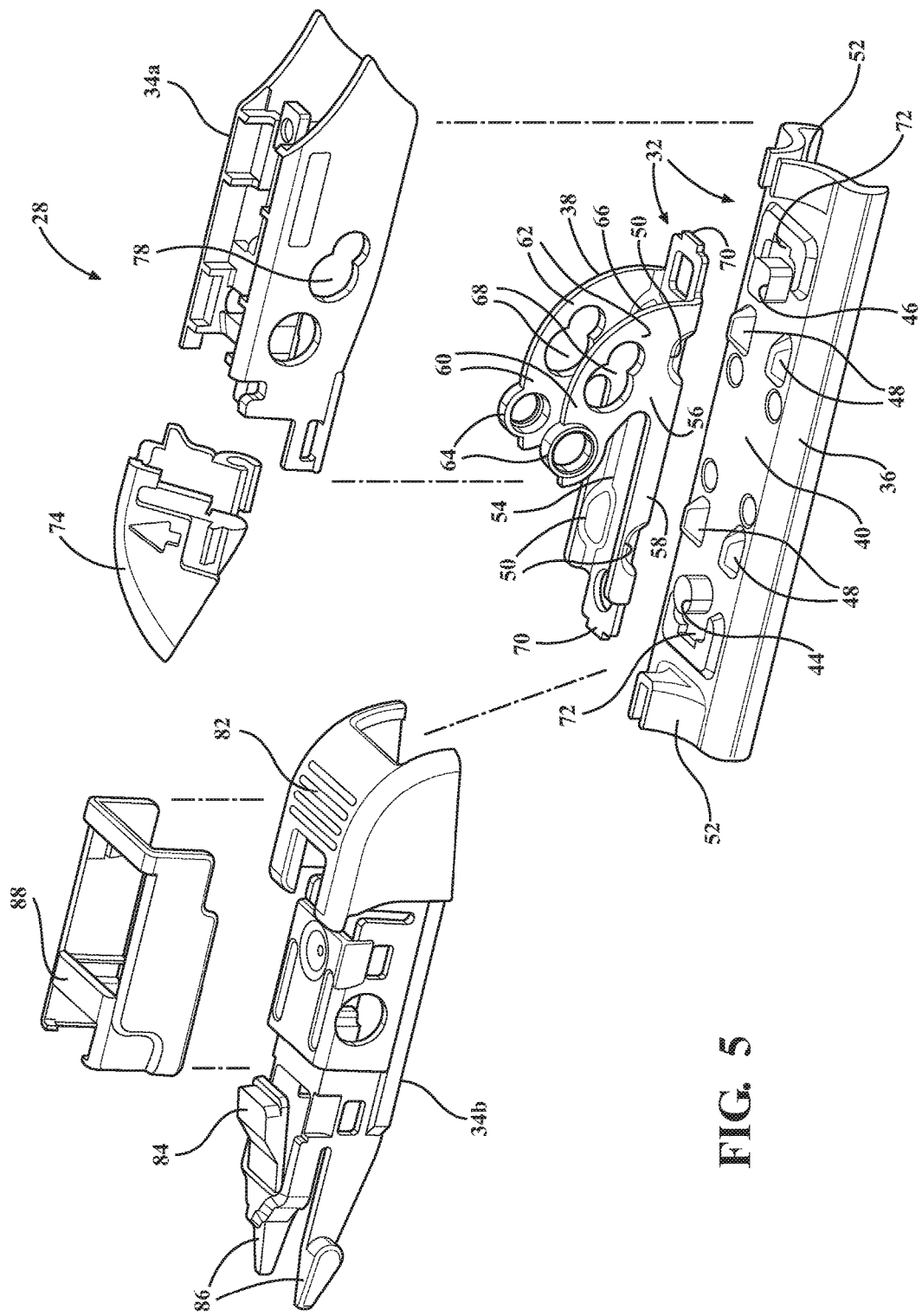
FIG. 5 is an exploded view of the connecting device of the wiper device of FIG. 1.

Referring now to FIG. 5, the exemplary embodiment of the connecting device includes a two-piece base 32 and a pair of joint parts 34. The joint parts 34 are pivotably connectable with the base 32 and are configured for attachment with different types and shapes of oscillating wiper arms. It should be appreciated that the wiper device may be include only one joint part or may include any desirable number of joint parts configured for attachment with any desirable types of oscillating wiper arms. The first piece 36 is preferably made of a single piece of an injection molded plastic, and the second piece 38 is preferably made of metal and is shaped through one or more stamping operations.

Figure 2:
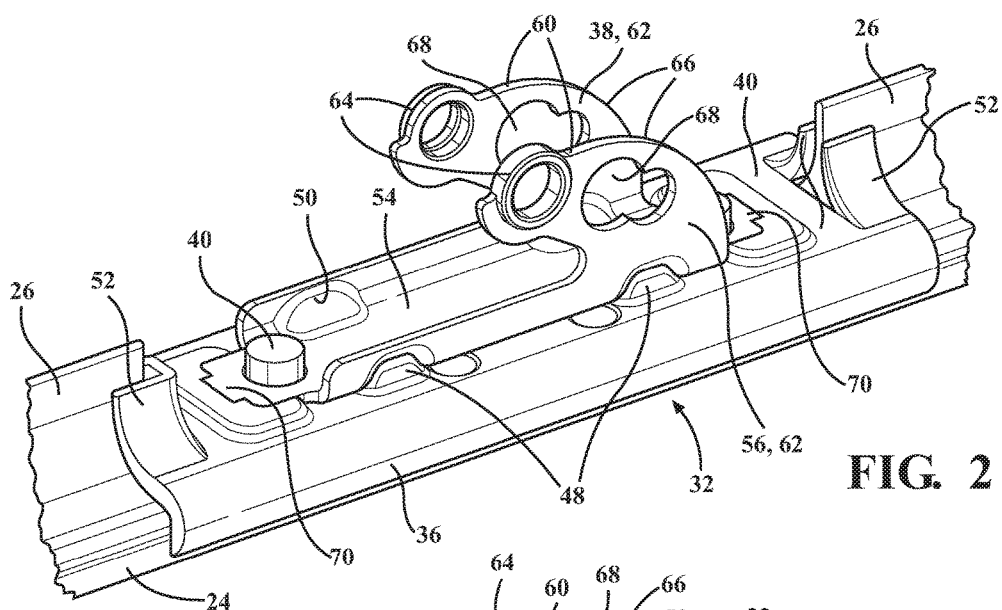
FIG. 2 is a perspective and fragmentary view of a base of a connecting device of the wiper device shown in FIG. 1.
Figure 3:
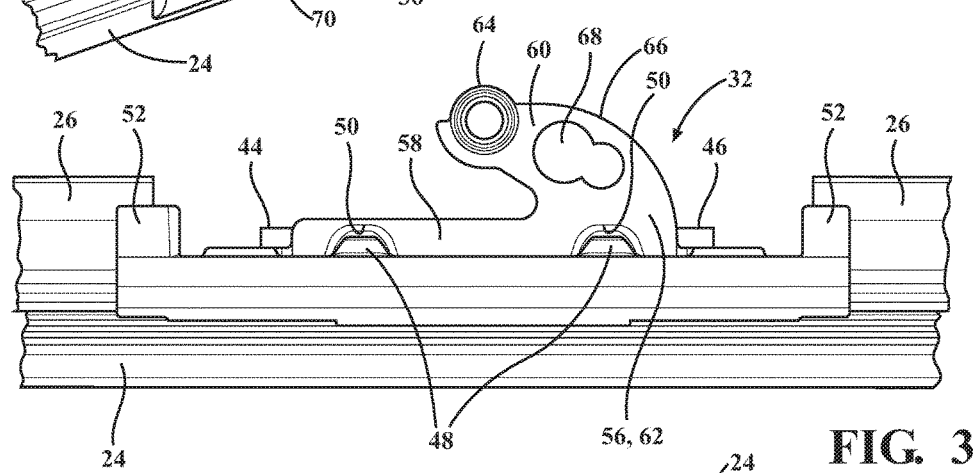
FIG. 3 is a fragmentary and front elevation view of the base of FIG. 2.

Referring now to FIGS. 2-4, the two pieces of the base 32 are a first piece 36 and a second piece 38, and these pieces 36, 38 are permanently (i.e., non-detachably) connected with one another. The first piece 36 has a top surface 40 which overlies the longitudinal strips 22 and has a generally flat portion. The first piece 36 also has a pair of holding arms 42 that are spaced laterally from one another and wrap around opposite lateral edges of the longitudinal strips 22 to secure the first piece 36 with the longitudinal strips 22. The plastic material of the first piece 36 is preferably fused with a plastic coating on each of the longitudinal strips 22 through an ultrasonic welding operation to lock the first piece 36 with the longitudinal strips 22. The top surface 40 also has a pair of protrusions 44, 46 that extend in a vertical direction and are spaced from one another in the longitudinal direction, and the second piece 38 has a pair of openings which are shaped similarly to the protrusions 44, 46 and receive the protrusions to interconnect the first and second pieces 36, 38 together. The protrusions 44, 46 have different shapes from one another to ensure that the second piece 38 of the base 32 can only be installed on the first piece 36 in one direction. Specifically, in the exemplary embodiment, one of the protrusions 44 is circular in shape, and the other protrusion 46 is square shaped. Preferably, after the second piece 38 is inserted onto the first piece with the protrusions 44 extending through the corresponding openings, the protrusions 44 are heat-staked to lock the first and second pieces 36, 38 together.

The top surface 40 of the first piece 36 also presents four upwardly extending bumps 48, and the second piece 38 includes a plurality of recesses 50 which receive the bumps 48. Lateral forces are transferred between the first and second pieces 36, 38 through the bumps 48 and recesses 50 as the wiper device 20 oscillates back and forth across the windshield during operation. In the exemplary embodiment, the first piece 36 includes four total bumps 48 which are all located, in the longitudinal direction, between the protrusions 46, 48.

The first piece 36 also has a pair of longitudinal end portions 50 which are spaced from one another and extend upwardly from the top surface 40. The end portions 52 are shaped to receive the sub-spoilers 26 such that during assembly, the sub-spoilers 26 are inserted into the end portions 52. As such, the first piece 36 of the base 32 and the sub-spoilers 26 partially overlap one another in the longitudinal direction.

Referring now to FIG. 2, the second piece 38 has a bottom wall 54 which directly overlies the top surface 40 of the first piece 36 such that the second piece 38 does not directly contact either of the longitudinal strips 22. The openings that receive the protrusions 44, 46 and the recesses 50 are all formed into the bottom wall 54.

The second piece 38 also has a pair of side walls 56 which extend vertically from the bottom wall 54 and which are spaced laterally from one another by an open space. As shown in FIG. 3, each of the side walls 56 is generally J-shaped with a long leg 58, which extends from the bottom wall 54 (shown in FIG. 2) and a short leg 60, which is spaced vertically above the long leg 58 by a gap. The long and short legs 58, 60 of each side wall 56 are interconnected with one another via a curved portion 62. The spaced apart and J-shaped side walls 56 are constructed as mirror images of one another.

Figure 6:
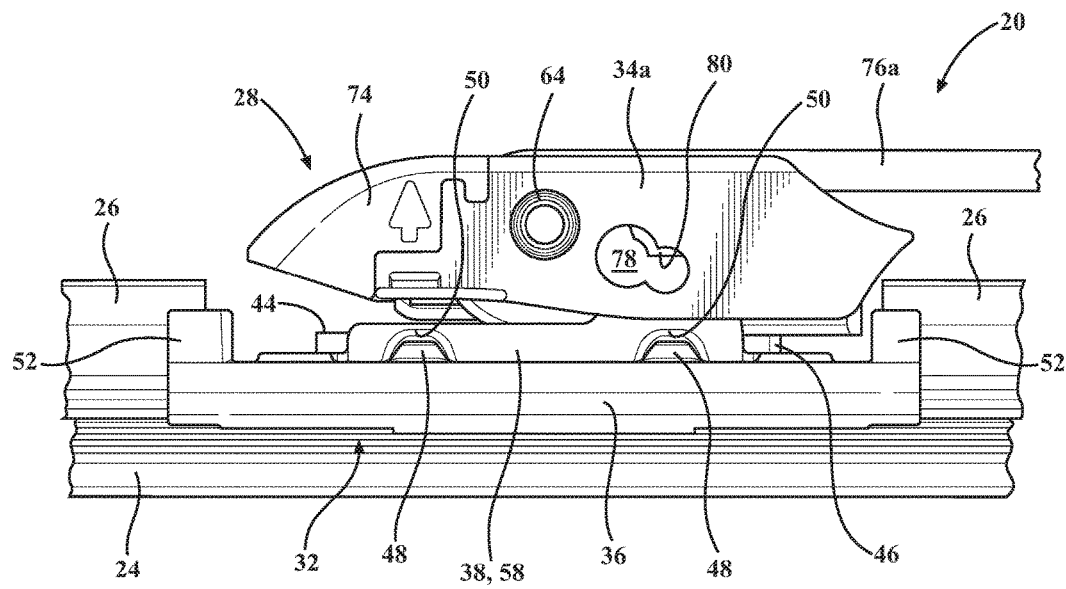
FIG. 6 is a fragmentary and front elevation view of the connecting device installed on a hook shaped oscillating wiper arm.
Figure 7:
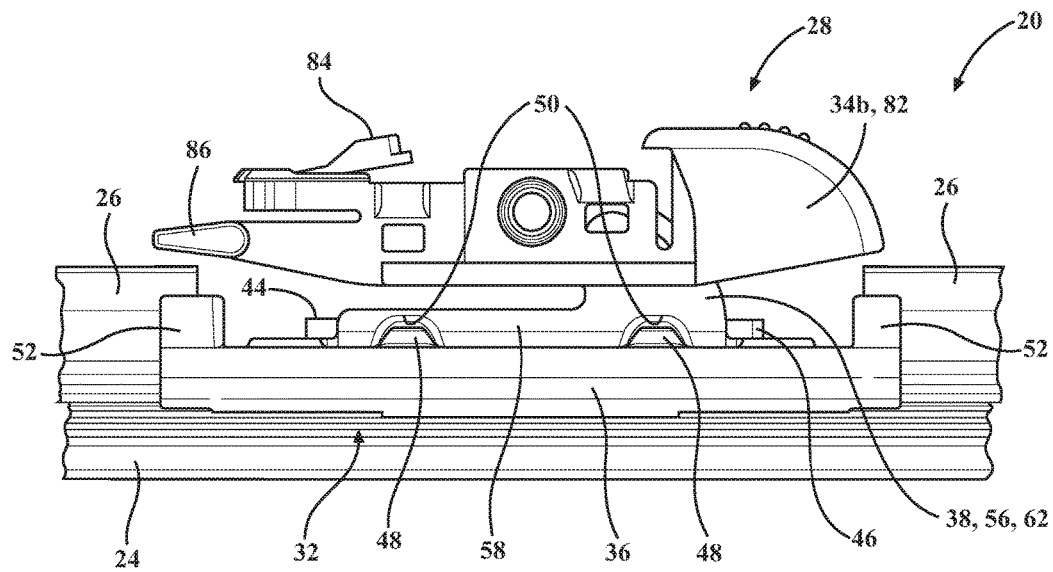
FIG. 7 is a fragmentary and front elevation view of the connecting device with a different joint part connected to the base.

Referring back to FIG. 2, the short legs 60 of the J-shaped side walls 56 have coaxial and circular projections 64 which project outwardly in opposite lateral directions from one another for interconnecting the base 32 with the joint parts 34. As shown in FIGS. 6 and 7, each of the joint parts 34 is generally U-shaped in cross-section with spaced apart and downwardly extending legs that have circular openings which receive the circular projections 64 to establish the pivoting relationship between the joint part 34 and the base 32. Referring back to FIG. 2, each of the side walls 56 also has a front edge 66 which is curved from a front longitudinal end of the side wall 56 towards the respective projection 64. Each projection 64 is disposed at a longitudinal back end of the short leg 60. The combination of the positioning of the projections 64 adjacent the back ends of the short legs 60 and the curved front edges 66 allows for increased articulation of the joint part 34 (shown in FIG. 5) on the base 32.

The curved portions 62 of the side walls 56 also present a pair of side pin openings 68 which overlap with one another to present a generally figure eight shaped opening. The side pin openings 68 allow the wiper device 20 to be attached with different sizes and types of side pin-style wiper arms (not shown).

As shown in FIG. 5, the bottom wall 54 of the second piece 38 extends longitudinally past opposite longitudinal ends of the side walls 56. Each longitudinal end of the bottom wall 54 has a tongue 70 which fits into a corresponding groove 72 on the top surface 40 of the first piece 36 to further lock the first and second pieces 36, 38 together. The openings for the circular and square protrusions 44, 46 of the first piece 36 overlap partially with the side walls 56 and are partly located on the portion of the bottom wall 54 that projects past the side walls 56.

Referring now to FIG. 6, the first exemplary joint part 34a includes a front door 74 which opens for connecting the joint part 34a with a hook-shaped wiper arm 76a and closes to lock the joint part 34a and the wiper device 20 with the hook-shaped wiper arm 76a. This joint part 34a also includes a pair of side pin windows 78 that are shaped similarly to and aligned with the side pin openings 68 in the second piece 38 of the base 32, and the joint part 34a includes a locking bar 80, which is partially visible through the side pin windows 78, for locking the joint part 34a with the hook-shaped wiper arm 76a. The lateral spacing of the side walls 56 (shown in FIG. 2) of the second piece 38 of the base 32 allows the locking bar 80 and a lower portion of the hook-shaped wiper arm 76a to be received in the open space between the side walls 56.

Referring now to FIG. 7, the second exemplary joint part 34b is shown in connection with the base 32. The second exemplary joint part 34b includes a front nose portion 82, which is resiliently movable forward and backward. The joint part 34b also has a top wall with a resiliently deflectable button 84 formed thereon and has a pair of rear locking tangs 86 which extend laterally outwardly.

Figure 8:
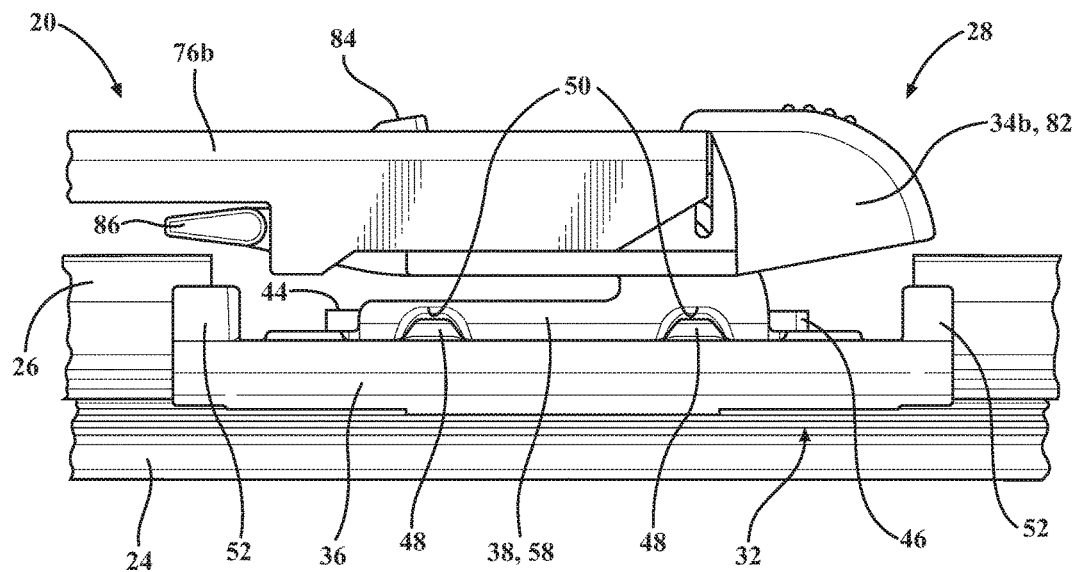
FIG. 8 is a fragmentary and front elevation view of the connecting device installed on a top lock-style wiper arm.
Figure 9:
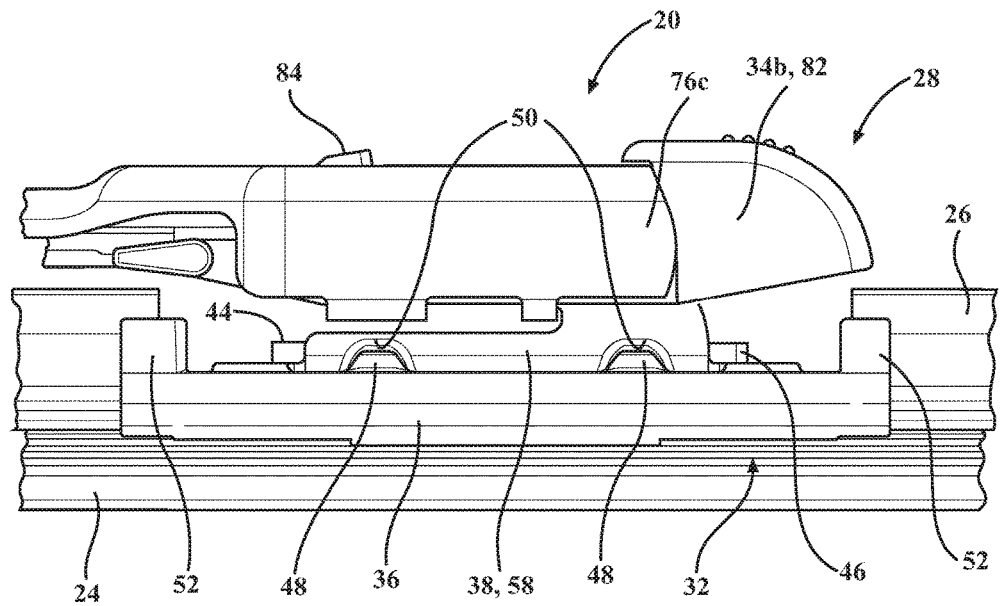
FIG. 9 is a fragmentary and front elevation view of the connecting device installed on one type of bayonet-style wiper arm.

FIG. 8 shows the second exemplary joint part 34b in connection with a top lock-style wiper arm 76b with the resiliently deflectable button 84 protruding through an opening in the wiper arm 34b and with the rear locking tangs 86 engaging rear ledges on the wiper arm 76b. FIG. 9 shows the second exemplary joint part 34b in connection with one type of bayonet-style wiper arm 76c with the resiliently deflectable button 84 protruding through an opening in the wiper arm 76c and with the front nose portion 82 lockingly engaging a front, top edge of the wiper arm 76c.

Figure 10:
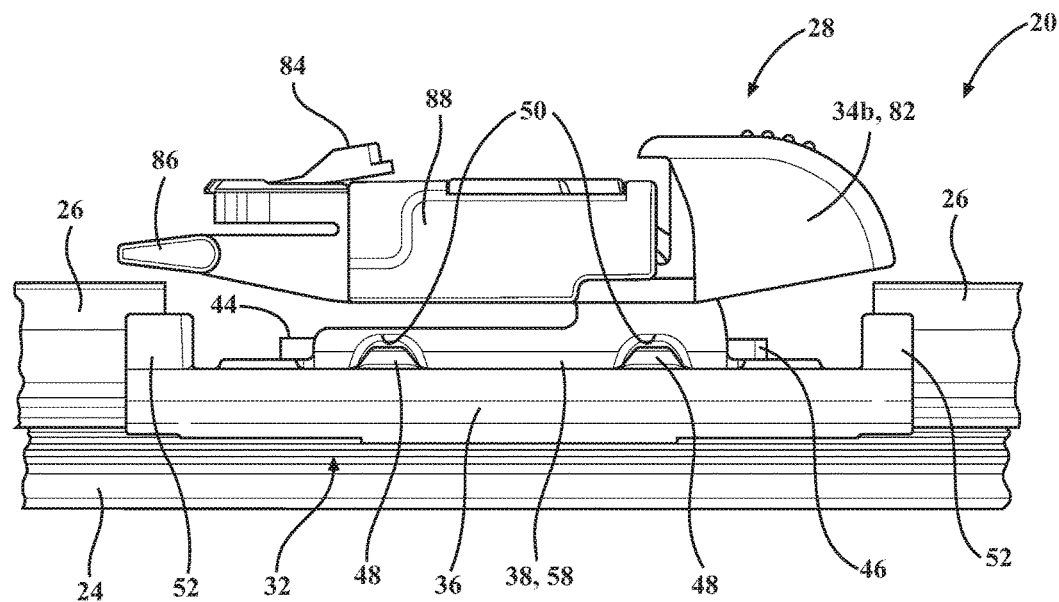
FIG. 10 is a fragmentary and front elevation view of the connecting device with the joint part of FIG. 7 connected to the base and with an adapter connected to the joint part.
Figure 11:
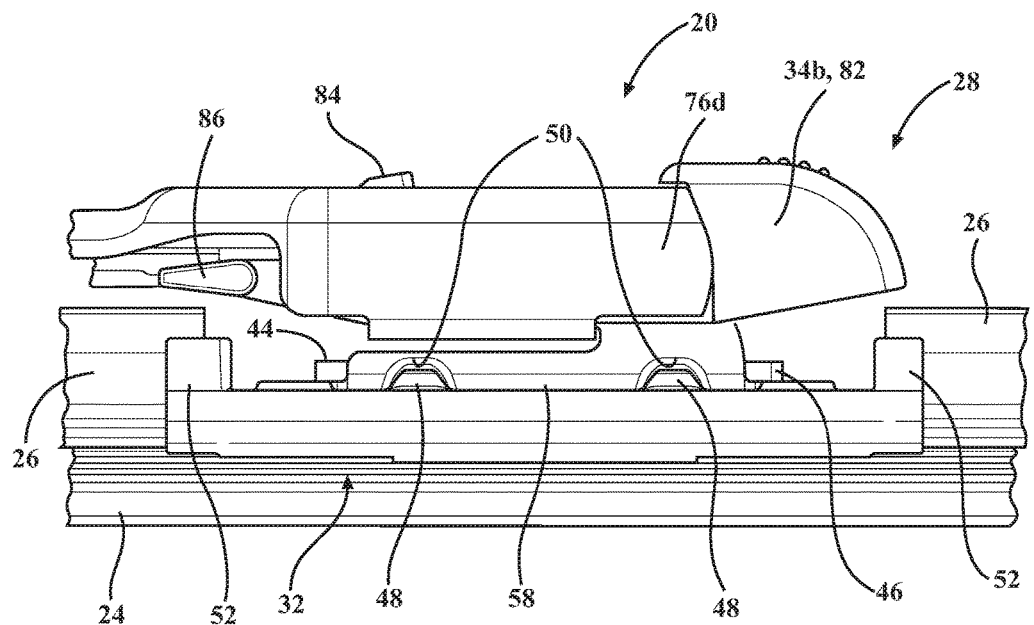
FIG. 11 is a fragmentary and front elevation view of the connecting device installed on a different type of bayonet-style wiper arm than FIG. 9.

As shown in FIG. 10, an adapter 88 can be received onto a middle portion of the second exemplary joint part 34b. The adapter 88 allows the joint part 34b to be connected with another type of bayonet-style wiper arm 76d, as shown in FIG. 11.

Another aspect of the present invention is related to a method of making a windscreen wiper device 20, such as the wiper device 20 shown in FIG. 1. The exemplary method includes the step of operably connecting the longitudinal strips 22 with the elastomeric wiper strip 24 to bias the wiper strip 24 into a pre-curved condition. The method continues with the step of permanently attaching the plastic first piece 36 of the base 32 with the metal second piece 38 of the base. Specifically, the exemplary method includes inserting the bumps 48 on the first piece 36 into the recesses 50 on the second piece 38 and inserting the circular and square shaped protrusions 44, 46 of the first piece 36 into similarly shaped openings on the second piece 38 and heat staking the protrusions 44, 46. The method proceeds with the steps of sliding the base 32 onto the longitudinal strips 22 and ultrasonically welding the first piece 36 of the base 32 with the longitudinal strips 22. The method continues with the step of operably connecting one of the joint parts 34 with the second piece 38 of the base 32 such that the joint part 34 is pivotable relative to the base 32.

Obviously, many modifications and variations of the present invention are possible in light of the above teachings. It is, therefore, to be understood that within the scope of the appended claims, the invention may be practiced otherwise than specifically described. It should also be appreciated that the directional terms such as "upper", "lower", "top" and "bottom" are in reference to the orientations of the enabling embodiment of the invention shown in the Figures and are not meant to require any certain orientation. Additionally, it is to be understood that all features of all claims and all embodiments can be combined with each other, as long as they do not contradict each other.

What is claimed is:

1. A windscreen wiper device, comprising:
   a wiper blade extending in a longitudinal direction;
   at least one longitudinal strip that is pre-curved to have a curved shape when in a relaxed condition and supporting said wiper blade and biasing said wiper blade into a curved shape;
   a connecting device attached with said at least one longitudinal strip, said connecting device including a two-piece base and said connecting device including a joint part that is pivotably connected with said base;
   said two-piece base including a first piece which is directly secured with said at least one longitudinal strip and a second piece with laterally spaced apart side walls that are each J-shaped;
   each of said J-shaped side walls having a short leg and a long leg which are partially spaced from one another by an open space;
   each of said short legs having a circular projection; and
   said circular projections of said side walls extending in opposite lateral directions and being coaxially aligned with one another for receiving openings in the joint part to pivotably connect the joint part with said second piece.

2. The windscreen wiper device as set forth in claim 1 wherein said first piece is made of plastic and said second piece is made of metal.

3. The windscreen wiper device as set forth in claim 2 wherein said first piece is heat staked to securely connect said first and second pieces together.

4. The windscreen wiper device as set forth in claim 3 wherein said first piece has a pair of protrusions that are spaced from one another in said longitudinal direction and wherein said protrusions of said first piece are received in similarly shaped openings in said second piece.

5. The windscreen wiper device as set forth in claim 4 wherein the protrusions have different shapes.

6. The windscreen wiper device as set forth in claim 4 wherein the heat staking of the first part is to the protrusions.

7. The windscreen wiper device as set forth in claim 1 wherein said first piece of said base has a top surface with a plurality of bumps that are spaced from one another and wherein said second piece has a plurality of recesses that receive said humps of said first piece.

8. The windscreen wiper device as set forth in claim 1 wherein said first piece of said base has a top surface with a groove and wherein said second piece has a bottom wall with a tongue that is received in said groove.

9. The windscreen wiper device as set forth in claim 1 wherein for each J-shaped side wall, said open space between said short and long legs of said side wall extends, in the longitudinal direction, on both sides of said projection on said side wall.

\* \* \* \* \*